US011676179B2

(12) United States Patent
Balasubramanian et al.

(10) Patent No.: US 11,676,179 B2
(45) Date of Patent: Jun. 13, 2023

(54) PERSONALIZATION OF ADVERTISEMENT SELECTION USING DATA GENERATED BY IOT DEVICES

(71) Applicant: INTERNATIONAL BUSINESS MACHINES CORPORATION, Armonk, NY (US)

(72) Inventors: Swaminathan Balasubramanian, Troy, MI (US); Mamnoon Jamil, Voorhees, NJ (US); Jian Wu, Mansfield, TX (US); Radha Mohan De, Howrah (IN); Cheranellore Vasudevan, Bastrop, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 46 days.

(21) Appl. No.: 17/121,536

(22) Filed: Dec. 14, 2020

(65) Prior Publication Data

US 2022/0188871 A1 Jun. 16, 2022

(51) Int. Cl.
*G06Q 30/0251* (2023.01)
*G06Q 30/0241* (2023.01)
(Continued)

(52) U.S. Cl.
CPC ......... *G06Q 30/0269* (2013.01); *G05B 15/02* (2013.01); *G06Q 30/0277* (2013.01); *G06Q 50/01* (2013.01); *G16Y 10/75* (2020.01)

(58) Field of Classification Search
CPC .......... G06Q 30/0269; G06Q 30/0277; G06Q 50/01; G16Y 10/75; G16Y 20/20;
(Continued)

(56) References Cited

U.S. PATENT DOCUMENTS 8,456,293 B1 * 6/2013 Trundle ............... H04L 67/535
705/14.1
8,996,035 B2 3/2015 Busch
(Continued)

FOREIGN PATENT DOCUMENTS

WO 2014066191 A2 5/2014

OTHER PUBLICATIONS

Y. Saleem, N. Crespi, M. H. Rehmani, R. Copeland, D. Hussein and E. Bertin, "Exploitation of social IoT for recommendation services," 2016 IEEE 3rd World Forum on Internet of Things (WF-IoT), 2016, pp. 359-364, doi: 10.1109/WF-IoT.2016.7845500. (Year: 2016).*
(Continued)

*Primary Examiner* — Marie P Brady
(74) *Attorney, Agent, or Firm* — Cuenot, Forsythe & Kim, LLC

(57) ABSTRACT

A client device can receive, from a data processing system, first data, the first data selected by the data processing system based on second data generated by at least one IoT device with which the client device is associated, and the first data indicating at least one advertisement. The client device can access the at least one advertisement using the first data indicating the at least one advertisement. The client device can add the at least one advertisement to the content accessed by the client device. The client device can present the content with the at least one advertisement added to the content.

15 Claims, 7 Drawing Sheets

(51) Int. Cl.
*G16Y 10/75* (2020.01)
*G05B 15/02* (2006.01)
*G06Q 50/00* (2012.01)

(58) Field of Classification Search
CPC ............ G16Y 40/10; G16Y 20/00–40; G16Y 40/00–50; G16Y 10/00–90
See application file for complete search history.

(56) References Cited

U.S. PATENT DOCUMENTS

| | | | |
|---|---|---|---|
| 2012/0036015 A1 | 2/2012 | Sheikh | |
| 2013/0198788 A1* | 8/2013 | Barger | H04N 21/266 725/32 |
| 2014/0067532 A1 | 3/2014 | Nelson et al. | |
| 2015/0006719 A1 | 1/2015 | Gupta et al. | |
| 2015/0019342 A1* | 1/2015 | Gupta | G06Q 30/0269 705/14.66 |
| 2016/0102879 A1* | 4/2016 | Guest | F24F 11/62 700/276 |
| 2016/0179962 A1* | 6/2016 | Patten | G06F 16/9535 707/706 |
| 2016/0358216 A1 | 12/2016 | Glover et al. | |
| 2017/0039599 A1 | 2/2017 | Tunnell et al. | |
| 2017/0068994 A1 | 3/2017 | Slomkowski et al. | |
| 2017/0074541 A1* | 3/2017 | Bentz | G05B 15/02 |
| 2017/0118574 A1* | 4/2017 | Park | H04L 67/02 |
| 2018/0103078 A1* | 4/2018 | Goswami | H04L 65/764 |
| 2019/0104191 A1* | 4/2019 | Lonij | H04L 67/55 |
| 2019/0129780 A1* | 5/2019 | DelSordo | G06F 11/0793 |
| 2019/0191203 A1* | 6/2019 | Asbun | H04N 21/4825 |
| 2020/0027125 A1 | 1/2020 | Segalov et al. | |
| 2021/0064648 A1* | 3/2021 | Farri | G06F 16/735 |
| 2022/0358344 A1* | 11/2022 | Tormasov | G06Q 50/01 |

OTHER PUBLICATIONS

Kim et al, "Empowering End Users for Social Internet of Things", IoTDI '17: Proceedings of the Second International Conference on Internet-of-Things Design and Implementation, Apr. 2017, pp. 71-82, https://doi.org/10.1145/3054977.3054987 (Year: 2017).*

Mell, P. et al., The NIST Definition of Cloud Computing, National Institute of Standards and Technology, U.S. Dept. of Commerce, Special Publication 800-145, Sep. 2011, 7 pg.

* cited by examiner

600

```
Receive, from a data processing system, first data, the first data selected by
the data processing system based on second data generated by at least one
IoT device with which the client device is associated, and the first data
indicating at least one advertisement
602
```

```
Access the at least one advertisement using the first data indicating the at
least one advertisement
604
```

```
Add the at least one advertisement to content accessed by the client device
606
```

```
Present the content with the at least one advertisement added to the content
608
```

FIG. 6

PERSONALIZATION OF ADVERTISEMENT SELECTION USING DATA GENERATED BY IOT DEVICES

BACKGROUND

The present invention relates to data processing systems, and more specifically, to Internet of Things (IoT) devices.

IoT devices are devices that are embedded with software and/or other technologies, and coupled to sensors, for the purpose of connecting and exchanging data with other devices and systems over the Internet. IoT devices oftentimes are implemented for home automation. For example, IoT devices commonly are embedded in various systems to control lighting, heating and air conditioning, media, refrigerators, televisions, security systems, garage door openers, pool systems, and camera systems. Still, IoT devices may be used with various other types of systems, including, but not limited to, medical and health related systems, automobiles, transportation systems, manufacturing systems, and so on.

SUMMARY

A method includes receiving, by a client device from a data processing system, first data, the first data selected by the data processing system based on second data generated by at least one IoT device with which the client device is associated, and the first data indicating at least one advertisement. The method also can include accessing, by the client device, the at least one advertisement using the first data indicating the at least one advertisement. The method also can include adding, by the client device, the at least one advertisement to the content accessed by the client device. The method also can include presenting, by the client device, the content with the at least one advertisement added to the content.

A client device includes a processor programmed to initiate executable operations. The executable operations include receiving, by the client device from a data processing system, first data, the first data selected by the data processing system based on second data generated by at least one IoT device with which the client device is associated, and the first data indicating at least one advertisement. The executable operations also can include accessing, by the client device, the at least one advertisement using the first data indicating the at least one advertisement. The executable operations also can include adding, by the client device, the at least one advertisement to the content accessed by the client device. The executable operations also can include presenting, by the client device, the content with the at least one advertisement added to the content.

A computer program product includes a computer readable storage medium having program code stored thereon. The program code is executable by a data processing system to initiate operations. The operations include receiving, by a client device from a data processing system, first data, the first data selected by the data processing system based on second data generated by at least one IoT device with which the client device is associated, and the first data indicating at least one advertisement. The operations also can include accessing, by the client device, the at least one advertisement using the first data indicating the at least one advertisement. The operations also can include adding, by the client device, the at least one advertisement to the content accessed by the client device. The operations also can include presenting, by the client device, the content with the at least one advertisement added to the content.

This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF THE DRAWINGS

FIG. 6 is a flowchart illustrating an example of a method of presenting content with at least one advertisement add to the content.

DETAILED DESCRIPTION

Figure 1:
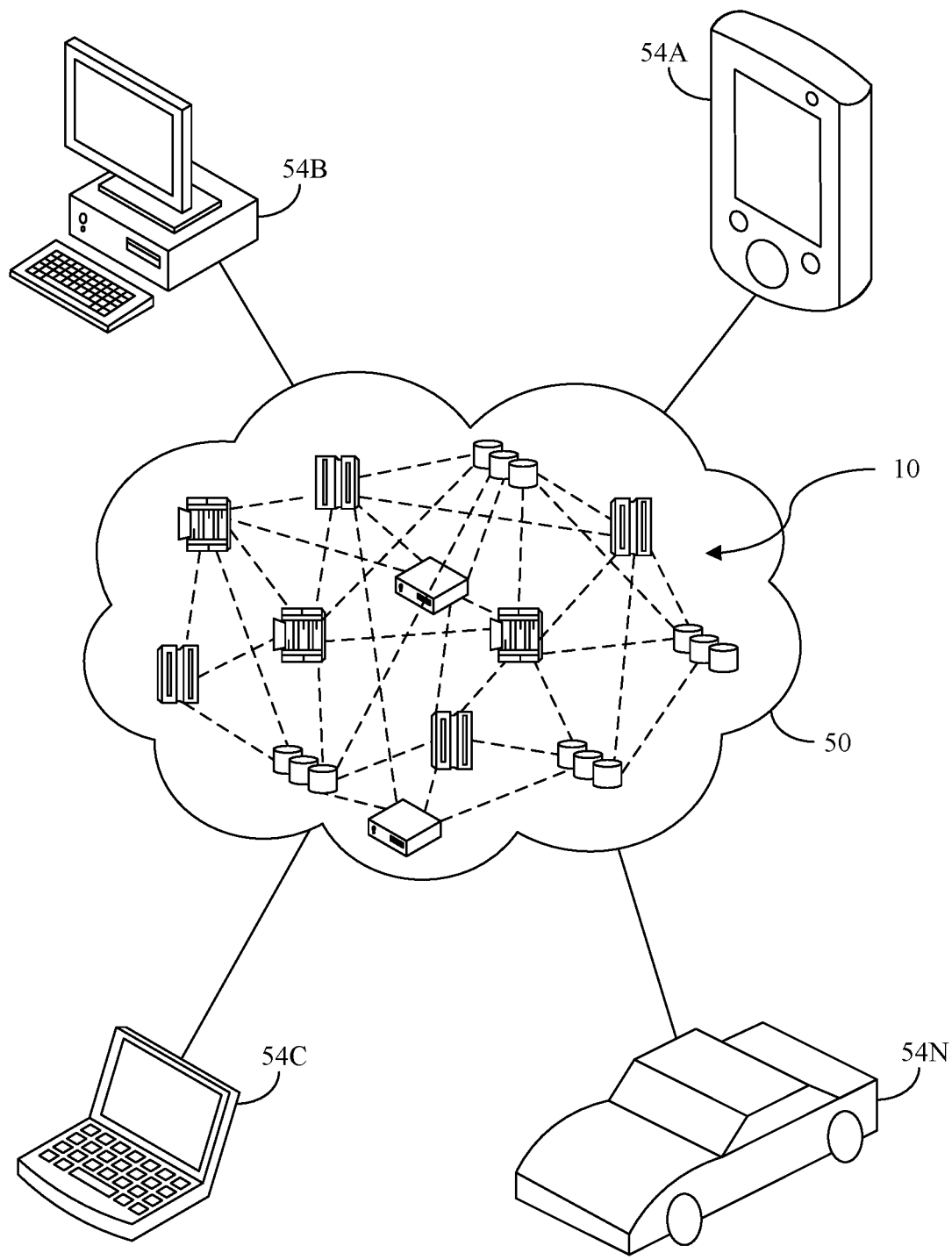
FIG. 1 depicts a cloud computing environment according to an embodiment of the present invention.

The present invention relates to data processing systems, and more specifically, to Internet of Things (IoT) devices.

The arrangements described herein are directed to computer technology and provide an improvement to computer technology. Specifically, the present arrangements improve the use of IoT devices. Specifically, the present arrangements use data generated by IoT devices to improve communication of advertisements to users via the Internet. In illustration, data generated by IoT devices can be used to personalize selection of advertisements to users. Moreover, client devices which present content to users can add the advertisements to the content, thus providing augmented reality to the content. In addition, the present arrangements can use the data generated by IoT devices to personalize selection of social content to users. Further, client devices which present content to users can add the social content to the content, thus providing further augmented reality to the content.

Several definitions that apply throughout this document now will be presented.

As defined herein, the term "processor" means at least one hardware circuit (e.g., an integrated circuit) configured to carry out instructions contained in program code. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

As used herein, the term "IoT" is an acronym of the term "Internet of Things."

As used herein, the term IoT device is a device that includes at least one processor and/or controller and that is coupled to at least one sensor that monitors at least one parameter of a device or system and transmits data generated by the at least one sensor to a client device and/or to a remote system. For example, an IoT device and sensor(s) can be embedded in a device or system. Computers, per se, such as servers, computer workstations, desktop computers, mobile computers, netbook computers, tablet computers and smart phones, are not IoT devices as the term "IoT device" is defined herein. Further, a client device, per se, is not an IoT device as the term "IoT device" is defined herein, but a client device can include in IoT device, for example as a device embedded in the client device. Network infrastructure, such as routers, firewalls, switches, access points and the like, are not are not IoT devices as the term "IoT" device is defined herein.

As defined herein, the term "sensor" means a device that responds to a physical stimulus (e.g., heat, light, audio pressure, magnetism, motion, etc.) generated by a component, device and/or system and outputs a resulting signal that is converted to data. As the term "sensor" is defined herein, input/output devices with which a user directly interacts are not a sensors as the term "sensor" is defined herein. In this regard, as the term "sensor" is defined herein, an input audio transducer that detects spoken utterances (e.g., a microphone) is not a sensor as the term "sensor" is defined herein. As the term "sensor" is defined herein, buttons, keys, keypads, keyboards, mice, touchscreens, and the like are not sensors as the term "sensor" is defined herein.

As defined herein, the term "data processing system" means one or more hardware systems configured to process data, each hardware system including at least one processor programmed to initiate executable operations and memory.

As defined herein, the term "server" means a data processing system configured to share services with one or more other data processing systems.

As defined herein, the term "client device" means a data processing system that requests shared services from a server, and with which a user directly interacts. Examples of a client device include, but are not limited to, a computer workstation, a desktop computer, a mobile computer, a laptop computer, a netbook computer, a tablet computer, a smart phone, and the like. Network infrastructure, such as routers, firewalls, switches, access points and the like, are not client devices as the term "client device" is defined herein. IoT devices are not client devices as the term "client device" is defined herein. A server is not a client device as the term "client device" is defined herein.

As defined herein, the term "social networking system" means a system comprising one or more servers that provide one or more social networking services, for instance via one or more websites. As the term "social networking system" is defined herein, a messaging system per se (e.g., an e-mail system, a text messaging system, or an instant messaging system) is not a social networking system, though a social networking system can include e-mail messaging services, text messaging services and/or an instant messaging services in addition to one or more social networking components.

As defined herein, the term "social networking service" means an online service platform on which social networks or social relations are built among people who, for example, share interests, activities, backgrounds or real-life connections, and via which people can share information with one another. People can hold conversations in a social networking service by posting messages. As the term "social networking service" is defined herein, a messaging service per se (e.g., an e-mail service, a text messaging service, or an instant messaging service) is not a social networking service, though a social networking service can include an e-mail messaging service, a text messaging service and/or an instant messaging service in addition to one or more social networking components.

As defined herein, the term "content delivery system" means one or more servers that provide content to one or more client devices via at least one communication network (e.g., the Internet, wide area networks, local area networks, mobile networks, etc.).

As defined herein, the term "content" means audio, video, audio/video, still images and/or text configured to be communicated over the Internet to a receiving device and to be presented by the receiving device (e.g., a client device) to one or more users. Metadata per se is not content as the term "content" is defined herein.

As defined herein, the term "social content" means content posted to a social networking service by a user for sharing with other users of the social networking service.

As defined herein, the term "advertisement" means audio, video, audio/video, one or more still images and/or text promoting or otherwise discussing a product or service.

As defined herein, the term "responsive to" means responding or reacting readily to an action or event. Thus, if a second action is performed "responsive to" a first action, there is a causal relationship between an occurrence of the first action and an occurrence of the second action, and the term "responsive to" indicates such causal relationship.

As defined herein, the term "computer readable storage medium" means a storage medium that contains or stores program code for use by or in connection with an instruction execution system, apparatus, or device. As defined herein, a "computer readable storage medium" is not a transitory, propagating signal per se.

As defined herein, the term "real time" means a level of processing responsiveness that a user or system senses as sufficiently immediate for a particular process or determination to be made, or that enables the processor to keep up with some external process.

As defined herein, the term "automatically" means without user intervention.

As defined herein, the term "user" means a person (i.e., a human being).

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
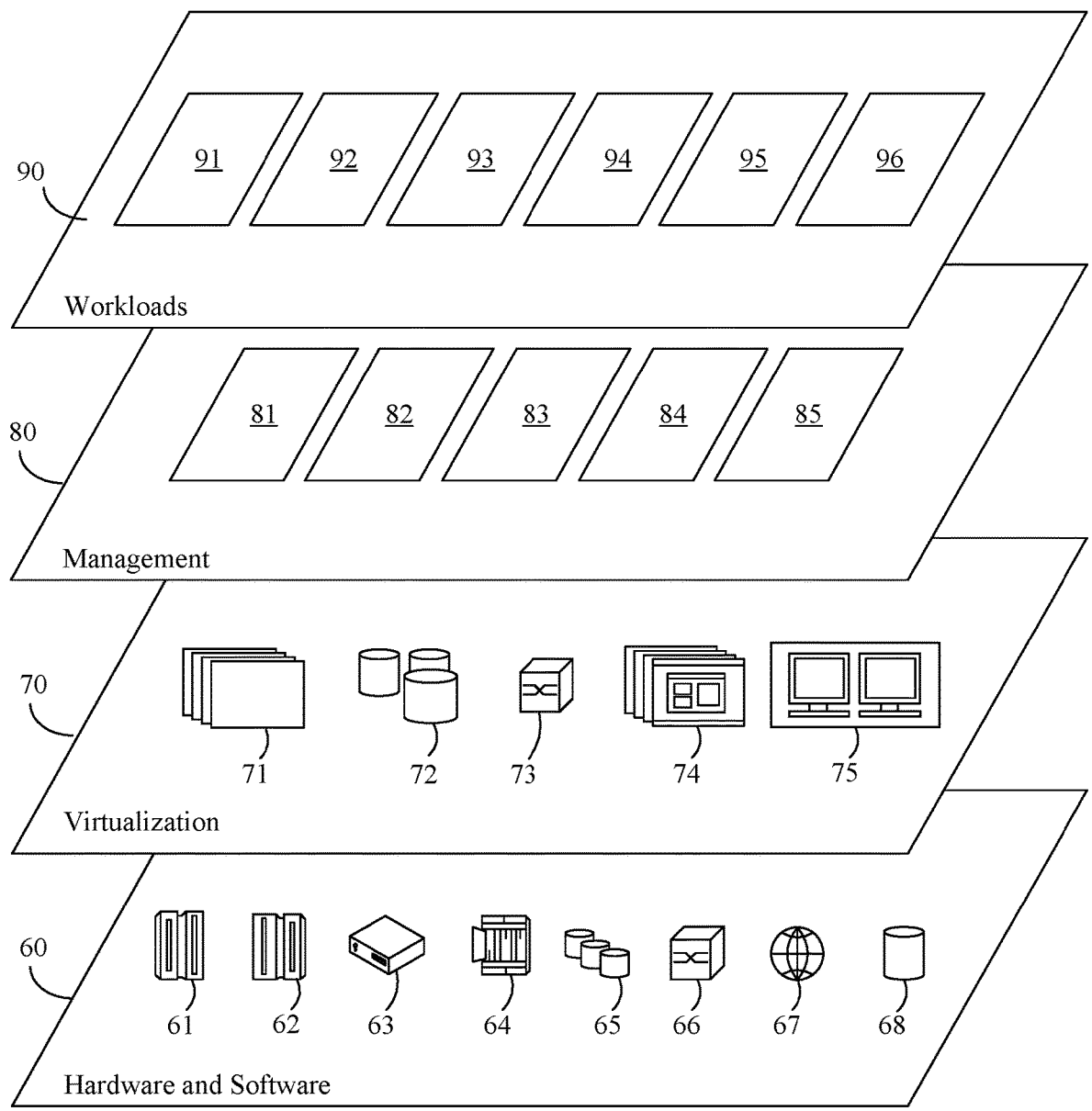
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and content delivery 96.

Figure 3:
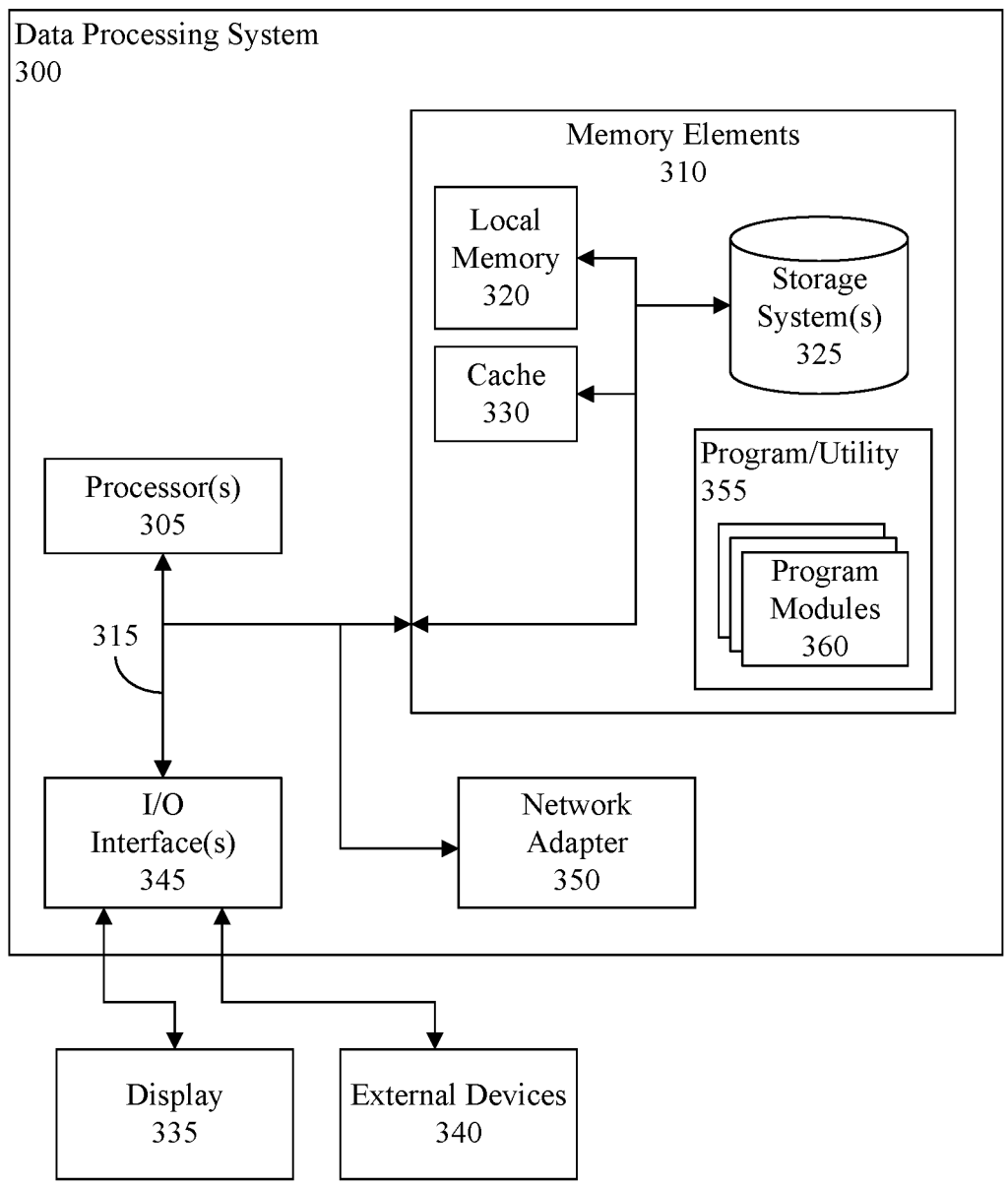
FIG. 3 is a block diagram illustrating example architecture for a processing system.

FIG. 3 is a block diagram illustrating example architecture for a data processing system 300 that can be implemented at the hardware and software layer 60. The data processing system 300 can include at least one processor 305 (e.g., a central processing unit) coupled to memory elements 310 through a system bus 315 or other suitable circuitry. As such, the data processing system 300 can store program code within the memory elements 310. The processor 305 can execute the program code accessed from the memory elements 310 via the system bus 315. It should be appreciated that the data processing system 300 can be implemented in the form of any system including a processor and memory that is capable of performing the functions and/or operations described within this specification. For example, the data processing system 300 can be implemented as a server, a plurality of communicatively linked servers, and so on.

The memory elements 310 can include one or more physical memory devices such as, for example, local memory 320 and one or more storage systems 325 comprising bulk storage devices. Local memory 320 refers to random access memory (RAM) or other non-persistent memory device(s) generally used during actual execution of the program code. The bulk storage device(s) can be implemented as one or more hard disk drives (HDDs), one or more solid state drives (SSDs), and/or one or more other persistent data storage devices. The data processing system 300 also can include one or more cache memories 330 that provide temporary storage of at least some program code in order to reduce the number of times program code must be retrieved from the local memory 320 and/or storage system 325 during execution.

Input/output (I/O) devices such as a display 335 and other external devices 340 (e.g., a keyboard, a mouse, etc.) can be coupled to the data processing system 300. The I/O devices can be coupled to the data processing system 300 either directly or through intervening I/O interfaces 345. For example, the display 335 can be coupled to the data processing system 300 via a graphics processing unit (GPU), which may be a component of the processor 305 or a discrete device. One or more network adapters 350 also can be coupled to the data processing system 300 to enable the data processing system 300 to become coupled to other systems, computer systems, remote printers, and/or remote storage devices through intervening private or public networks. Modems, cable modems, wireless transceivers, and Ethernet cards are examples of different types of network adapters 350 that can be used with the data processing system 300.

As pictured in FIG. 3, the memory elements 310 can store the components of the data processing system 300, namely programs and/or utilities 355 comprising program modules 360. Being implemented in the form of executable program code, these components of the data processing system 300 can be executed by the processor(s) 305 and, as such, can be considered part of the data processing system 300. Moreover, the programs and/or utilities 355 are functional data structures that impart functionality when employed as part of the data processing system 300.

Figure 4:
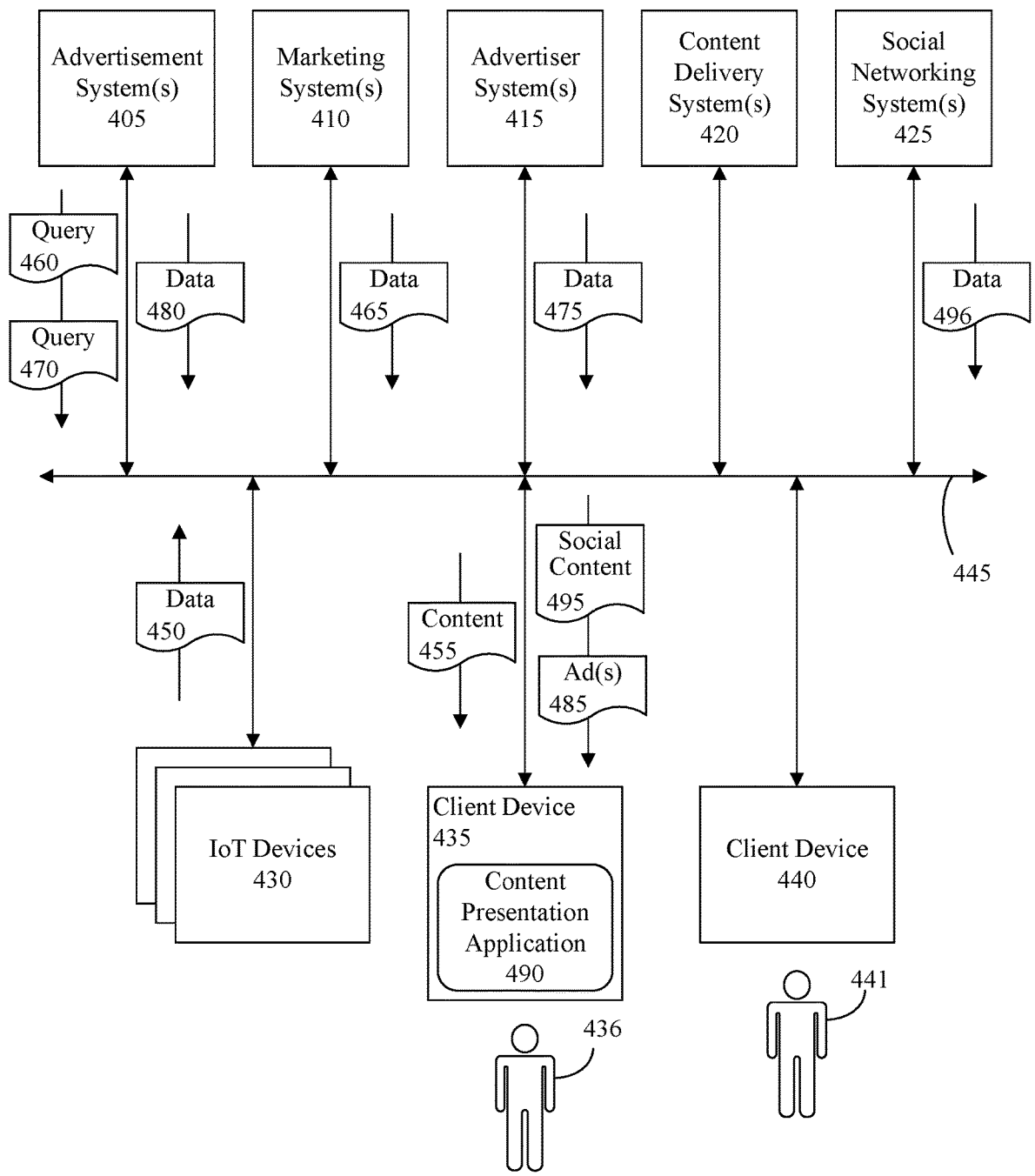
FIG. 4 is a block diagram illustrating an example of a content delivery computing environment.

FIG. 4 is a block diagram illustrating an example of a content delivery computing environment (hereinafter "environment") 400. The environment 400 can include one or more advertisement systems 405, one or more marketing systems 410, one or more advertiser systems 415, one or more content delivery systems 420, and one or more social networking systems 425. Each of the systems 405-425 can be configured in accordance with the architecture of the data processing system 300 of FIG. 3. Various processes performed by the advertisement system 405, marketing system 410, advertiser system 415, content delivery system 420, and social networking system 425 can be performed by the respective programs/utilities 355 depicted in FIG. 3.

The environment 400 also can include a plurality of IoT devices 430, a client device 435, and a client device 440. The client device 435 can be used by a user 436, and the client device 440 can be used by a user 441. The environment also can include one or more additional client devices (not shown).

The components 405, 410, 415, 420, 425, 430, 435, 440 can be communicatively linked to at least one communication network 445. The communication network 445 is the medium used to provide communications links between various devices and data processing systems connected together within the environment 400. The communication network 445 can include connections, such as wire, wireless communication links, or fiber optic cables. The communication network 445 can be implemented as, or include, any of a variety of different communication technologies such as a wide area network (WAN), a local area network (LAN), a wireless network, a mobile network, a Virtual Private Network (VPN), the Internet, the Public Switched Telephone Network (PSTN), and/or similar technologies.

Examples of IoT devices 430 include, but are not limited to, devices coupled to appliances, air conditioning systems, televisions, tools, automobiles, etc. via at least one sensor. In illustration, an IoT device 430 can be embedded in a refrigerator and can receive signals from one or more sensors monitoring performance of the refrigerator, one or more sensors monitoring components of the refrigerator, etc. Such signals can indicate any of variety of information related to an issue with the refrigerator. For example, based on the sensor signals, the IoT device 430 can determine a general issue with the refrigerator, a nature of the issue, a faulty component of the refrigerator, a component should be repaired, replaced or serviced, and so on. The IoT device 430 can generate data 450 based on the sensor signals and indicate in the data 450 determinations made by the IoT device 430.

In another example, an IoT device 430 can be coupled to an automobile via at least one sensor. For instance, an IoT device can be embedded in an automobile. For instance, the IoT device 430 can be an engine control unit (ECU) or an engine management system (EMS) and can receive signals from sensors monitoring engine operation and/or engine components, sensors monitoring transmission operation and/or transmission components, sensors monitoring suspension operation and/or suspension components, sensors monitoring air conditioning operation and/or air conditioning components, as well as sensors monitoring operation and/or components of various other devices and systems of the automobile. Such signals can indicate any of a variety of information related to an issue with the automobile. For example, based on the sensor signals, the IoT device 430 can determine a general issue with the automobile, a nature of the issue, a component or device has failed and/or performance of the component or device has degraded, a component should be replaced or serviced, and so on. The IoT device 430 can generate data 450 based on the sensor signals and indicate in the data 450 determinations made by the IoT device 430.

In another arrangement, an IoT device 430 can be coupled to a sensor of the client device 435. In this regard, the IoT device 430 can be embedded in the client device 435. Still, the IoT devices 430 can be any of a myriad of other types of devices or systems and receive sensor signals from any of a myriad of other types of sensors. Accordingly, the present arrangements are not limited in this regard.

The IoT devices 430 can continually, or periodically, monitor signals output by sensors communicatively linked to the IoT devices 430. One or more of the IoT devices 430 can communicate data 450 to the client device 435 and/or the advertisement system 405 automatically in real time as the data 450 is generated by the sensors, and/or one or more of the IoT devices 430 can periodically communicate the data 450 to the client device 435 and/or the advertisement system 405, for example every minute, every five minutes, every ten minutes, ever thirty minutes, every hour, etc. Similarly, One or more of the IoT devices 430 can communicate data 450 to the client device 440 and/or the advertisement system 405 automatically in real time as the data 450 is generated by the sensors, and/or one or more of the IoT devices 430 can periodically communicate the data 450 to the client device 440 and/or the advertisement system 405.

In illustration, one or more of the IoT device 430 can be configured to automatically communicate data 450 to the client device 435, and the client device 435 can communicate that IoT data 450 to the advertisement system 405. Similarly, one or more of the IoT device 430 can be configured to communicate data 450 to the client device 440, and the client device 440 can communicate that data 450 to the advertisement system 405. Other IoT devices 430 can communicate data 450 to other client devices (not shown), and those client devices can communicate that IoT data 450 to the advertisement system 405.

In an arrangement, the IoT devices 430 automatically can add to the data 450 additional data indicating the device or system, for example the manufacturer of the device or system, a model number, a serial number, etc. In another arrangement, each client device 435, 440 can store or otherwise access a data table, for example in a database, indicating a device or system in which each IoT device 430 is coupled. In such an arrangement, each client device 435, 440 automatically can add to the data 450 additional data indicating the device or system, for example the manufacturer of the device or system, a model number, a serial number, a component that is faulty, a model number of the component, a serial number of the component, etc. Based on which client device 435, 440 communicates the data 450 to the advertisement system 405, the advertisement system 405 can determine to which client device 435, 440 and/or user 436, 441 the data 450 corresponds.

In another or further arrangement, one or more of the IoT devices 430 can be configured to automatically communicate data 450 to the advertisement system 405. In such an arrangement, each of the IoT devices 430 which do so can be assigned to, or otherwise associated with one or more client devices 435, 440 and/or one or more users 436, 441 of the client devices 435, 440. For example, the data 450 communicated by each respective IoT device 430 can include a unique identifier assigned to the IoT device 430 or the device or system in which the IoT device 430 is coupled, for example a Media Access Control (MAC) address and/or an Internet Protocol (IP) address. As noted, optionally, the data 450 also can include additional data indicating the device, system and/or component of the device or system that is faulty, for example the manufacturer of the device, system or component, a model number, a serial number, etc. The advertisement system 405 can include, or otherwise access, at least one data table, for example in a database, that stores records associating each unique IoT device identifier with one or more users 436, 441 and/or one or more client devices 435, 440. Accordingly, the advertisement system 405 can determine to which user(s) 436, 441 and/or client devices 435, 440 data generated by each IoT device 430 corresponds. In an arrangement in which the data 450 does not include additional data indicating the device or system, for example the manufacturer of the device, system or component, a model number, a serial number, etc., the advertisement system 405 can access one or more data tables, for example in a database, that includes records that correlates information such as the manufacturer of the device, system or component, a model number, a serial number, etc. with the MAC address and/or IP address.

In an arrangement, responsive to the user 436 accessing content 455 using the client device 435, for example from the content delivery system 420, the advertisement system 405 can, automatically in real time, analyze data 450 received from the client device 435 and/or received from IoT devices 430 associated with the client device 435. The analysis can include identifying data 450, if any, indicating an issue with a device or system, for example within a threshold period of time. The threshold period of time can be the last day, the last week, the last two weeks, the last month, the last three months, the last six months, the last year, etc. Responsive to identifying such data 450, the advertisement system 405 can determine, based on the data 450, products or services relevant to the issue.

In another arrangement, responsive to receiving data 450 from an IoT device 430 associated with the client device 435, indicating an issue with a device or system, the advertisement system 405 can, automatically in real time, determine products or services relevant to the issue based on the data 450.

Regardless of which process is used to trigger the advertisement system 405 to determine the products or services relevant to the issue, if the data 450 indicates an issue with a device or system, the advertisement system 405 can determine a general category of the device or system. Further, the advertisement system 405 can determine a faulty or worn component, including the manufacturer and model number of the faulty or worn component.

In the following description, examples using an appliance (e.g., a refrigerator) will be discussed, but it is to be understood that the present arrangements are not limited to this example. Indeed, the present arrangements can be applied to any of a myriad of other devices and systems, including other types of appliances, televisions, automobiles, tools, etc. having corresponding IoT devices 430.

Responsive to determining the products or services relevant to the issue, the advertisement system can, automatically in real time, communicate to the marketing system 410 a query 460 requesting data relevant to the device, system and/or component that is faulty.

In a non-limiting arrangement, the advertisement system 405 can access a user profile of the user 436 indicating advertising preferences of the user. For example, the user profile can indicate types of advertisements to be shown to the user 436, types of advertisements not to be shown to the user 436, and so on. In such an arrangement, the advertisement system 405 can determine the products or services relevant to the issue based, at least in part, on the user profile. For instance, if the user profile indicates that the user 436 chooses not to be presented advertisements related to appliance repair service, the advertisement system 405 can structure the query 460 to exclude data pertinent to appliance repair services.

In response to the query, the marketing system 410 can, automatically in real time, communicate the requested data 465 to the advertisement system 405. The data 465 can indicate one or more advertisement systems 415 for advertisers (e.g., companies) that provide products and/or services relevant to the device, system and/or component that is faulty.

Responsive to receiving the data 465, the advertisement system 405 can, automatically in real time, communicate a query 470 to one or more advertiser systems 415 indicated in the data 465. The query 470 can the indicate the products or services relevant to the issue with the device or system, for example a general category of the device or system, a manufacturer, model number, serial number, etc. of the device or system, a faulty component, including the manufacturer and model number of the faulty component, etc. In response to receiving the query 470, the advertiser system 415 can, automatically in real time, communicate to the advertisement system 405 data 475 (e.g., metadata) indicating one or more advertisements 485 corresponding to the device or system, the general category of the device or system and/or the faulty component. For example, if the issue is with a refrigerator, the data 475 can indicate an advertisement 485 for refrigerators provided by the advertiser, an advertisement 485 for replacement components for the refrigerator, an advertisement 485 for refrigerator repair services and/or the like. The data 475 also can provide a link for downloading the advertisement 485, for example from the advertiser system 415 or from the content delivery system 420.

Responsive to receiving the data 475, the advertisement system 405 can, automatically in real time, communicate to the client device 435 data 480. The data 480 can include at least a portion of the data 475, including one or more links for downloading the advertisement(s) 485.

In an arrangement in which the client device 435 accessing content 455 triggers the advertisement system 405 to determine the products or services relevant to the issue, responsive to receiving the data 480 the client device 435 can, automatically in real time, access the advertisement(s) 485 indicated in the data 480 responsive to receiving the data 480.

In an arrangement in which the advertisement system 405 receiving the data 450 triggers the advertisement system 405 to determine the products or services relevant to the issue, responsive to receiving the data 480 the client device 435 can store the data 480. The client device 435 can access the advertisement(s) 485 indicated in the data 480 responsive to the user 436 opening a content presentation application 490 on the client device 435 or responsive to the user 436 initiating the content application 190 to access content 455 from the content delivery system 420.

Regardless of which process is used to trigger the client device 435 to access the advertisement(s) 485, the content presentation application 490 can be configured to add the advertisement(s) 485 to the content 455. In this regard, the content presentation application 490 can add augmented reality to the content 455 using the advertisement(s) 485. The content presentation application 490 can present to the user 436 the content 455 with the advertisements 485 added to the content 455. For example, the content presentation application 490 can add one or more advertisements 485 to a beginning of the content 455 so that the advertisement(s) 485 is/are presented to the user 436 prior to presentation of the rest of the content 455 commencing. The content presentation application 490 can add one or more advertisements 485 between adjacent segments of the content 455 so that at certain points during presentation of the content 455 is paused and one or more advertisements 485 are presented. After the advertisement(s) 485 are presented presentation of the content 455 can commence from where presentation of the content 455 was paused. The content presentation application 490 can add one or more advertisements 485 to an end of the content 455 so that the advertisement(s) 485 is/are presented to the user 436 immediately after presentation of the rest of the content 455 has completed.

In an arrangement in which one or more advertisements 485 are inserted between adjacent segments of the content 455, the content presentation application 490 can determine the adjacent segments of the content 455 based on metadata in the content 455 indicating a scene change or a subject change. The metadata can include, for example, time markers or frame markers indicating between which frames of the content 455 scene changes and/or subject changes take place. If the content 455 does not include such metadata, the content presentation application 490 can define points in the content 455 where the content 455 is to be segmented for the advertisement(s) 485 to be inserted into the content 455. For instance, the content presentation application 490 can determine the points to be at specific time markers during the presentation or after specific numbers of frames. In a further example, the content presentation application 490 can analyze the content 455 to identify scene changes and/or brief pauses in audio playback and insert one or more advertisements 485 into the content 455 at one or more of the scene changes and/or brief pauses in audio playback.

In an arrangement, the content presentation application 490 can select the at least one advertisement 485 to present in the content 455 based on a type of the content 455. For example, the data 480 may indicate advertisements that are audio only, advertisements that are audio/video, advertisements that are still images and advertisements that are text. The content presentation application 490 can select advertisements that match the format of the content 455. For example, if the content 455 is in an audio format, the content presentation application 490 can select one or more advertisements 485 that are in an audio format, and add the selected advertisement(s) 485 to the content 455. If the content 455 is in an audio/video format, the content presentation application 490 can select one or more advertisements 485 that are in an audio/video format, and add the selected advertisement(s) 485 to the content 455. If the content 455 is one or more still images, the content presentation application 490 can select one or more advertisements 485 that are still images, and add the selected advertisement(s) 485 to the content 455. If the content 455 is text, the content presentation application 490 can select one or more advertisements 485 that are text, and add the selected advertisement(s) 485 to the content 455. In a non-limiting arrangement, the client device 435 can implement machine learning to select advertisements 485 to add to the content 455.

In an aspect of the present arrangements, the client device 435 can create a text message describing the advertisement(s) 485 and the client device 435 can present the text message to the user 436.

In an aspect of the present arrangements, in lieu of, or in addition to, adding one or more advertisements 485 to the content 455, the content presentation application 490 can add social content 495 to the content 455. The social content 495 can be, for example, audio, video, audio/video, still images and/or text posted by a contact of the user 436 in one or more social networking services provided by one or more social networking systems 425. The contact can be, for example, the user 441. By way of example, if the data 450 indicates that an oil filter of the automobile of the user 436 needs to be replaced, and the user 441 has posted a video in the social networking services showing how to replace the oil filter on the same model of vehicle, the advertisement system 405 can identify that video and, in response, the content presentation application 490 can present that video.

In illustration, one or more users 436, 441 of the client devices 435, 440 can be socially connected, for example in a social networking service provided by a social networking system 425. The advertisement system 405 can interface with the social networking services to determine such social connections. The advertisement system 405 can create associations between data 450 generated by IoT devices 430 assigned to various client devices 435, 440 and/or users 436, 441 based on the social connections of the users 436, 441.

In illustration, assume an IoT device 430 assigned to the user 436 monitors a device or system of the user 436, and an IoT device 430 assigned to the user 441 monitors a device or system of the user 441. The IoT device 430 monitoring the device or system of the user 436 can generate data 450 indicating that the device or system needs to be serviced. In an arrangement, the advertisement system 405 can detect such data 450, automatically in real time, as the data is received. In another arrangement, the advertisement system 405 can, automatically in real time, analyze data 450 corresponding to IoT devices 430 of the user 436 responsive to the user 436 accessing content 455 using the client device 435, for example from the content delivery system 420. The analysis can include identifying data 450, if any, indicating an issue with a device or system, for example within a threshold period of time.

Regardless of how the process of the advertisement system 405 detecting the data 450 is triggered, responsive to detecting such data 450, the advertisement system 405 can, based on the social connections of the user 436, identify other users, for example the user 441, whose IoT devices 430 generated data indicating similar devices or systems needed to be repaired, replaced or serviced, for example devices or systems similar to a device or system of the user 436 that needs to be repaired, replaced or serviced. The advertisement system 405 can search data 450 received within a threshold time period, for example data 450 received within the last month, data 450 received within the last six months, data 450 received within the last year, data 450 received within the last two years, data 450 received within the last 5 years, etc.

In response to identifying that the user 441 had device or system that needed repair and that appliance is similar to the device or system of the user 436 that needs repair, the advertisement system 405 can query the social networking system(s) 425 to access data (e.g., metadata) assigned to social content posted by the user 441 that pertains to the device or system that needed repair. In response, the social networking system(s) 425 can determine whether any such social content 495 has been posted in the social networking system(s) 425 and, if so, communicate to the advertisement system 405 data 496 indicating one or more social content 495. For example, the data 496 can include one or more links to the social content 495 in the social networking system 425. The advertisement system 405 can include at least a portion of that data 496 in the data 480 communicated to the client device 435.

In an arrangement in which the client device 435 accessing content 455 triggers the advertisement system 405 to determine the products or services relevant to the issue, responsive to receiving the data 480 the client device 435 can, automatically in real time, access the social content 495 indicated in the data 480 responsive to receiving the data 480.

In an arrangement in which the advertisement system 405 receiving the data 450 triggers the advertisement system 405 to determine the products or services relevant to the issue, responsive to receiving the data 480 the client device 435 can store the data 480. The client device 435 can access the social content 495 indicated in the data 480 responsive to the user 436 opening a content presentation application 490 on the client device 435 or responsive to the user 436 initiating the content application 190 to access content 455 from the content delivery system 420.

Regardless of which process is used to trigger the client device 435 to access the social content 495, the content presentation application 490 can be configured to add the one or more social content 495 to the content 455. The content presentation application 490 can present to the user 436 the content 455 with the one or more social content 495 added to the content 455. In this regard, the content presentation application 490 can add augmented reality to the content 455 using the social content 495. For example, the content presentation application 490 can add the social content 495 to a beginning of the content 455 so that the social content 495 is/are presented to the user 436 prior to presentation of the rest of the content 455 commencing. The content presentation application 490 can add social content 495 between adjacent segments of the content 455 so that at certain points during presentation of the content 455 is paused and social content 495 is/are presented. After the social content 495 is/are presented presentation of the content 455 can commence from where presentation of the content 455 was paused. The content presentation application 490 can add social content 495 to an end of the content 455 so that the social content 495 is/are presented to the user 436 immediately after presentation of the rest of the content 455 has completed. In an arrangement in which social content 495 is/are inserted between adjacent segments of the content 455, the content presentation application 490 can determine the adjacent segments of the content 455, for example as previously described.

In an aspect of the present arrangements, the client device 435 can create a text message describing the social content 495 and the client device 435 can present the text message to the user 436.

In an arrangement, the content presentation application 490 can select the at least one social content 495 to present in the content 455 based on a type of the content 455. For example, the data 480 may indicate social content that are audio only, social content that are audio/video, social content that are still images and social content that are text. The content presentation application 490 can select one or more social content 495 that match the format of the content 455. For example, if the content 455 is in an audio format, the content presentation application 490 can select one or more social content 495 that are in an audio format, and add the selected social content 495 to the content 455. If the content 455 is in an audio/video format, the content presentation application 490 can select one or more social content 495 that are in an audio/video format, and add the selected social content 495 to the content 455. If the content 455 is one or more still images, the content presentation application 490 can select one or more social content 495 that is one or more still images, and add the selected social content 495 to the content 455. If the content 455 is text, the content presentation application 490 can select one or more social content 495 that is text, and add the selected social content 495 to the content 455. In a non-limiting arrangement, the client device 435 can implement machine learning to select social content 495 to add to the content 455.

Figure 5:
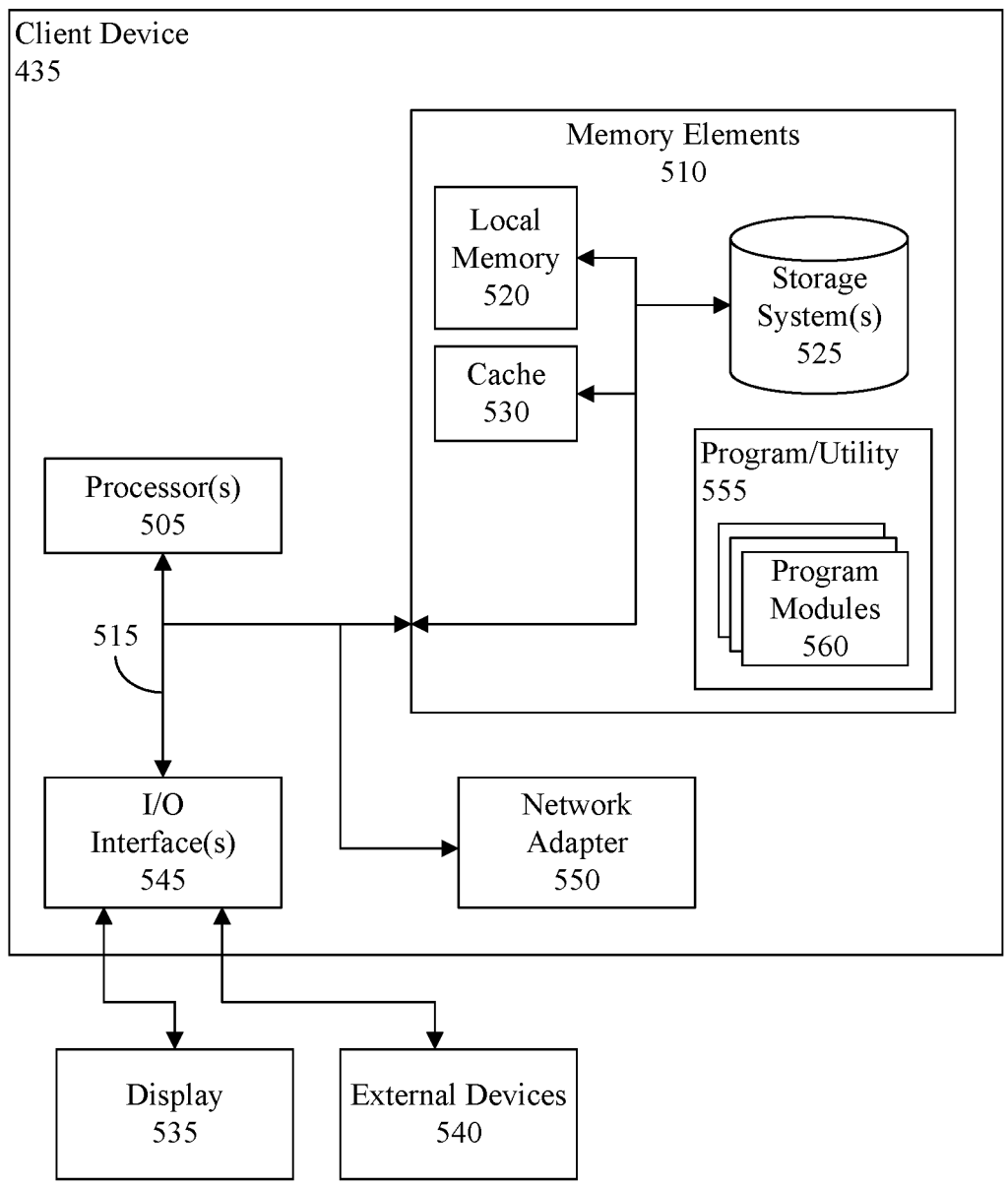
FIG. 5 is a block diagram illustrating example architecture for a client device.

FIG. 5 is a block diagram illustrating example architecture for the client device 435 of FIG. 4. The client device 440 can be configured in a similar manner.

The client device 435 can include at least one processor 505 (e.g., a central processing unit) coupled to memory elements 510 through a system bus 515 or other suitable circuitry. As such, the client device 435 can store program code within the memory elements 510. The processor 505 can execute the program code accessed from the memory elements 510 via the system bus 515.

The memory elements 510 can include one or more physical memory devices such as, for example, local memory 520 and one or more storage systems 525 comprising bulk storage devices. The client device 435 also can include one or more cache memories 530 that provide temporary storage of at least some program code in order to reduce the number of times program code must be retrieved from the local memory 520 and/or storage system 525 during execution.

Input/output (I/O) devices such as a display 535 and other external devices 540 (e.g., a keyboard, a mouse, etc.) can be coupled to the client device 435. The I/O devices can be coupled to the client device 435 either directly or through intervening I/O interfaces 545. For example, the display 535 can be coupled to the client device 435 via a graphics processing unit (GPU), which may be a component of the processor 505 or a discrete device. Moreover, the display 535 can be integrated into the client device 435. For example, the display 535 can be a touch screen. One or more network adapters 550 also can be coupled to, or otherwise integrated with, the client device 435 to enable the client device 435 to become coupled to other systems, computer systems, remote printers, and/or remote storage devices through intervening private or public networks. Modems, cable modems, wireless transceivers, and Ethernet cards are examples of different types of network adapters 550 that can be used with the client device 435.

As pictured in FIG. 5, the memory elements 510 can store the components of the data processing system 500, namely programs and/or utilities 555 comprising program modules 560. One such program 555 can be, for example, the content presentation application 490 of FIG. 4. Being implemented in the form of executable program code, these components of the client device 435 can be executed by the client device 435 and, as such, can be considered part of the client device 435. Moreover, the programs and/or utilities 555 are functional data structures that impart functionality when employed as part of the client device 435.

FIG. 6 is a flowchart illustrating an example of a method 600 of presenting content with at least one advertisement add to the content. The method 600 can be implemented by the client device 435 of FIGS. 4 and 5.

At step 602, the client device can receive, from a data processing system, first data, the first data selected by the data processing system based on second data generated by at least one IoT device with which the client device is associated, and the first data indicating at least one advertisement. In an arrangement, the IoT device can be coupled to another device or system via at least one sensor. For instance, the IoT device can be embedded in the other device or system. In another arrangement, the IoT device can be coupled to the client device via at least one sensor. For instance, the IoT device can be embedded in the client device. The second data, for example, can indicate an issue with the client device or an issue with the other device or system to which the IoT device is coupled.

At step 604, the client device can access at least one advertisement using the first data indicating the at least one advertisement.

At step 606, the client device can add the at least one advertisement to content accessed by the client device.

At step 608, the client device can present the content with the at least one advertisement added to the content.

Figure 7:
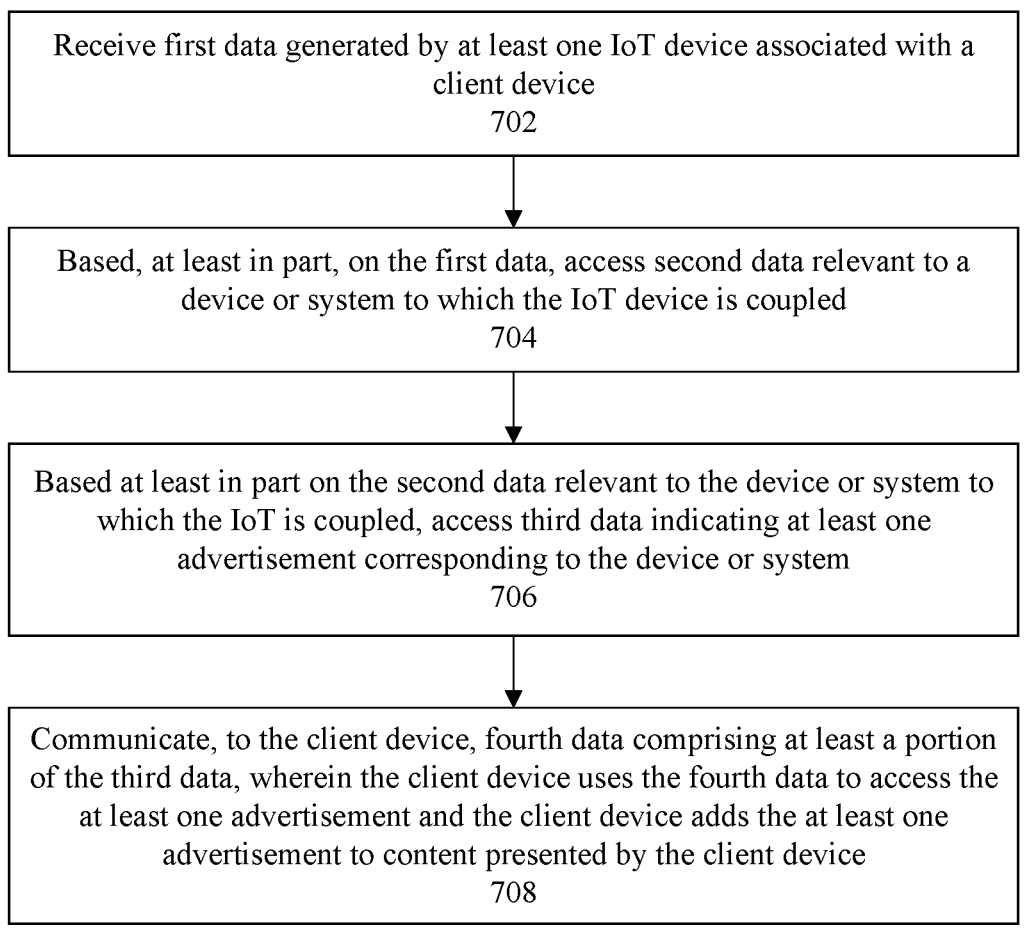
FIG. 7 is a flowchart illustrating an example of a method of indicating to a client device at least one advertisement to be added to content to be presented by the client device.

FIG. 7 is a flowchart illustrating an example of a method 700 of indicating to a client device at least one advertisement to be added to content to be presented by the client device. The method 700 can be implemented by a data processing system, for example the advertisement system 405 of FIG. 4.

At step 702 the data processing system can receive first data generated by at least one IoT device associated with a client device. In an arrangement, the IoT device can be coupled to another device or system via at least one sensor. For instance, the IoT device can be embedded in the other device or system. In another arrangement, the IoT device can be coupled to the client device via at least one sensor. For instance, the IoT device can be embedded in the client device. The first data can indicate an issue with the client device or an issue with the other device or system. In an arrangement, the advertisement system can receive the first data from the IoT device. In another arrangement, the client device can receive the first data from the IoT device and communicate the IoT data to the advertisement system.

At step 704 the data processing system can, based at least in part on the first data, access second data relevant to a device or system (e.g., the client device or another device or system) to which the IoT device is coupled.

At step 706 the data processing system can, based at least in part on the second data relevant to the device or system to which the IoT is coupled, access third data indicating at least one advertisement corresponding to the device or system. The third data, for example, can include one or more links for downloading the at least one advertisement.

At step 708 the data processing system can communicate, to the client device, fourth data comprising at least a portion of the third data. The client device can use the fourth data to access the at least one advertisement. The client device can add the at least one advertisement to content presented by the client device.

The foregoing description is just an example of embodiments of the invention, and variations and substitutions. While the disclosure concludes with claims defining novel features, it is believed that the various features described herein will be better understood from a consideration of the description in conjunction with the drawings. The process(es), machine(s), manufacture(s) and any variations thereof described within this disclosure are provided for purposes of illustration. Any specific structural and functional details described are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this disclosure, specify the presence of stated features, integers, steps, operations, elements, and/or components, but do not preclude the presence or addition of one or more other features, integers, steps, operations, elements, components, and/or groups thereof.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this disclosure, specify the presence of stated features, integers, steps, operations, elements, and/or components, but do not preclude the presence or addition of one or more other features, integers, steps, operations, elements, components, and/or groups thereof.

Reference throughout this disclosure to "one embodiment," "an embodiment," "one arrangement," "an arrangement," "one aspect," "an aspect," or similar language means that a particular feature, structure, or characteristic described in connection with the embodiment is included in at least one embodiment described within this disclosure. Thus, appearances of the phrases "one embodiment," "an embodiment," "one arrangement," "an arrangement," "one aspect," "an aspect," and similar language throughout this disclosure may, but do not necessarily, all refer to the same embodiment.

The term "plurality," as used herein, is defined as two or more than two. The term "another," as used herein, is defined as at least a second or more. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, etc. may be used herein to describe various elements, these elements should not be limited by these terms, as these terms are only used to distinguish one element from another unless stated otherwise or the context indicates otherwise.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
   receiving, by a first data processing system, first data generated by at least one Internet of Things device;
   responsive to the receiving the first data generated by the at least one Internet of Things device, the first data processing system determining at least a first user, or a client device used by the first user, to which the first data corresponds;
   identifying that the first data indicates an issue with a system by the first data processing system automatically analyzing, in real time, the first data;
   responsive to the identifying that the first data indicates the issue with the system, the first data processing system automatically communicating, in real time, to a second data processing system at least a first query requesting second data relevant to the system, and the first data processing system receiving the second data from the second data processing system, the second data indicating at least a third data processing system for an advertiser for at least one product or service relevant to the issue with the system;
   responsive to the receiving the second data indicating the at least the third data processing system for the advertiser for the at least one product or service relevant to the issue with the system, the first data processing system automatically communicating, in real time, to the third data processing system at least a second query indicating the product or service relevant to the issue with the system, and the first data processing system receiving from the third data processing system third data indicating at least one advertisement corresponding to the system;
   responsive to the receiving the third data indicating the at least one advertisement corresponding to the system, the first data processing system automatically communicating, in real time, to the client device associated with the Internet of Things device at least one link for downloading the at least one advertisement corresponding to the system, wherein the client device downloads the at least one advertisement corresponding to the system using the at least one link and presents the at least one advertisement to the first user; and
   automatically communicating, by the first data processing system in real time, fourth data to the client device, the fourth data indicating at least one social content comprising video showing how to repair the system to overcome the issue with the system, wherein the at least one social content comprising the video showing how to repair the system to overcome the issue with the system is posted to a social networking service by a second user with whom the first user is socially connected in the social networking service, wherein the client device presents to the first user the video showing how to repair the system to overcome the issue.

2. The method of claim 1, wherein the receiving, by the first data processing system, the first data generated by the at least one Internet of Things device comprises:
   receiving, by the first data processing system, from the at least one Internet of Things device, the first data generated by the at least one Internet of Things device.

3. The method of claim 1, wherein the receiving, by the first data processing system, the first data generated by the at least one Internet of Things device comprises:
   receiving, by the first data processing system, from the client device, the first data generated by the at least one Internet of Things device, wherein the client device receives the first data from the at least one Internet of Things device.

4. The method of claim 3, wherein the client device adds, to the first data, fifth data indicating the system.

5. The method of claim 1, wherein the identifying that the first data indicates the issue with the system by the first data processing system automatically analyzing, in real time, the first data comprises:
the first data processing system identifying that the first data indicates that the issue with the system is within a threshold period of time.

6. A first data processing system, comprising:
a processor programmed to initiate executable operations comprising:
receiving, by the first data processing system, first data generated by at least one Internet of Things device;
responsive to the receiving the first data generated by the at least one Internet of Things device, the first data processing system determining at least a first user, or a client device used by the first user, to which the first data corresponds;
identifying that the first data indicates an issue with a system by the first data processing system automatically analyzing, in real time, the first data;
responsive to the identifying that the first data indicates the issue with the system, the first data processing system automatically communicating, in real time, to a second data processing system at least a first query requesting second data relevant to the system, and the first data processing system receiving the second data from the second data processing system, the second data indicating at least a third data processing system for an advertiser for at least one product or service relevant to the issue with the system;
responsive to the receiving the second data indicating the at least the third data processing system for the advertiser for the at least one product or service relevant to the issue with the system, the first data processing system automatically communicating, in real time, to the third data processing system at least a second query indicating the product or service relevant to the issue with the system, and the first data processing system receiving from the third data processing system third data indicating at least one advertisement corresponding to the system;
responsive to the receiving the third data indicating the at least one advertisement corresponding to the system, the first data processing system automatically communicating, in real time, to the client device associated with the Internet of Things device at least one link for downloading the at least one advertisement corresponding to the system, wherein the client device downloads the at least one advertisement corresponding to the system using the at least one link and presents the at least one advertisement to the first user; and
automatically communicating, by the first data processing system in real time, fourth data to the client device, the fourth data indicating at least one social content comprising video showing how to repair the system to overcome the issue with the system, wherein the at least one social content comprising the video showing how to repair the system to overcome the issue with the system is posted to a social networking service by a second user with whom the first user is socially connected in the social networking service.

7. The first data processing system of claim 6, wherein the receiving, by the first data processing system, the first data generated by the at least one Internet of Things device comprises:
receiving, by the first data processing system, from the at least one Internet of Things device, the first data generated by the at least one Internet of Things device.

8. The first data processing system of claim 6, wherein the receiving, by the first data processing system, the first data generated by the at least one Internet of Things device comprises:
receiving, by the first data processing system, from the client device, the first data generated by the at least one Internet of Things device, wherein the client device receives the first data from the at least one Internet of Things device.

9. The first data processing system of claim 8, wherein the client device adds, to the first data, fifth data indicating the system.

10. The first data processing system of claim 6, wherein the identifying that the first data indicates the issue with the system by the first data processing system automatically analyzing, in real time, the first data comprises:
the first data processing system identifying that the first data indicates that the issue with the system is within a threshold period of time.

11. A computer program product, comprising:
one or more computer readable storage mediums having program code stored thereon, the program code stored on the one or more computer readable storage mediums collectively executable by a first data processing system to initiate operations including:
receiving, by the first data processing system, first data generated by at least one Internet of Things device;
responsive to the receiving the first data generated by the at least one Internet of Things device, the first data processing system determining at least a first user, or a client device used by the first user, to which the first data corresponds;
identifying that the first data indicates an issue with a system by the first data processing system automatically analyzing, in real time, the first data;
responsive to the identifying that the first data indicates the issue with the system, the first data processing system automatically communicating, in real time, to a second data processing system at least a first query requesting second data relevant to the system, and the first data processing system receiving the second data from the second data processing system, the second data indicating at least a third data processing system for an advertiser for at least one product or service relevant to the issue with the system;
responsive to the receiving the second data indicating the at least the third data processing system for the advertiser for the at least one product or service relevant to the issue with the system, the first data processing system automatically communicating, in real time, to the third data processing system at least a second query indicating the product or service relevant to the issue with the system, and the first data processing system receiving from the third data processing system third data indicating at least one advertisement corresponding to the system;
responsive to the receiving the third data indicating the at least one advertisement corresponding to the system, the first data processing system automatically communicating, in real time, to the client device associated with the Internet of Things device at least one link for downloading the at least one advertisement corresponding to the system, wherein the client device downloads the at least one advertisement corresponding to the system using the at least one link and presents the at least one advertisement to the first user; and automatically communicating, by the first data processing system in real time, fourth data to the client device, the fourth data indicating at least one social content comprising video showing how to repair the system to overcome the issue with the system, wherein the at least one social content comprising the video showing how to repair the system to overcome the issue with the system is posted to a social networking service by a second user with whom the first user is socially connected in the social networking service.

12. The computer program product of claim 11, wherein the receiving, by the first data processing system, the first data generated by the at least one Internet of Things device comprises:

receiving, by the first data processing system, from the at least one Internet of Things device, the first data generated by the at least one Internet of Things device.

13. The computer program product of claim 11, wherein the receiving, by the first data processing system, the first data generated by the at least one Internet of Things device comprises:

receiving, by the first data processing system, from the client device, the first data generated by the at least one Internet of Things device, wherein the client device receives the first data from the at least one Internet of Things device.

14. The computer program product of claim 13, wherein the client device adds, to the first data, fifth data indicating the system.

15. The computer program product of claim 11, wherein the identifying that the first data indicates the issue with the system by the first data processing system automatically analyzing, in real time, the first data comprises:

the first data processing system identifying that the first data indicates that the issue with the system is within a threshold period of time.

* * * * *